Patented Mar. 28, 1950

2,502,254

UNITED STATES PATENT OFFICE 2,502,254

MANUFACTURE OF PIGMENTS

Joseph Glassman, Blackley, Manchester, England, assignor to Imperial Chemical Industries Limited, a corporation of Great Britain No Drawing. Application November 26, 1946, Serial No. 712,251. In Great Britain December 7, 1945

4 Claims. (Cl. 106—289)

This invention relates to the manufacture of pigments and more particularly it relates to the manufacture of pigments in a highly dispersed form suitable for the pigmentation of masses to be spun into artificial filaments, and especially for the pigmentation of viscose before spinning.

A method of producing brown shades by mass pigmentation of viscose is to mix the viscose solution before spinning, two or more pigments in suitable proportions to give the desired shade of brown. Thus for example brown shades can be obtained by using mixtures of carbon black, Monolite Fast Yellow GN (Schultz-Farbstoff Tabellen No. 84) and Monolite Fast Scarlet RN (Schultz-Farbstoff Tabellen No. 86; Colour Index No. 69). This method however suffers from the disadvantage that the shade of the filaments obtained shows wide variation: there has been a separation of the black from the yellow or scarlet as a result of differences of behaviour in or near the spinnerets.

We have now found that highly dispersed pigments suitable for the mass pigmentation of viscose can be obtained by generating an azo pigment in the presence of carbon black. That is to say, according to the invention, we bring about the coupling of a diazotised amine and another usual intermediate for a yellow, orange or red azo pigment in the presence of carbon black dispersed in one or other of the aqueous solutions of which the mixing brings about the coupling.

The carbon black used is that which is commonly used as an ingredient in rubber mixes, and which is distinguished as gas black, being obtained by the incomplete combustion of natural gas. This form of black is miscible with water and differs in that respect from lamp black. The carbon black should be highly dispersed before use. The dispersion may be carried out for example by gravel milling in the presence of water, caustic soda and disodium dinaphthylmethane-di-$\beta$-sulphonate until the bulk of the mass of material is in the form of particles not greater than 6 microns in diameter, and the material contains no particles greater than 10 microns in diameter.

The products of the invention are conveniently preserved in the form of aqueous pastes.

The products of the invention are, as will be understood, brown pigments, the shade of the black being tempered, so to speak, with yellow, orange or red. They can be used without further dispersion for the pigmentation of viscose before spinning and they do not show the undesirable property of giving filaments of varying shades due to the separation of the carbon black from the azo pigment during the spinning process. Any azo combination available per se as a yellow, orange or red pigment (insoluble in water) may be used.

The invention is illustrated but not limited by the following examples in which the parts are by weight.

Example 1

150 parts of carbon black are dispersed by milling with water, caustic soda and disodium dinaphthylmethane-di-$\beta$-sulphonate. The dispersion so obtained and an aqueous solution of 70 parts of disodium dinaphthylmethane-di-$\beta$-sulphonate are added to a filtered solution of 195 parts acetoacet-o-toluidide and 42 parts of caustic soda in 1200 parts of water at 20° C. The acetoacet-o-toluidide is then precipitated by the addition of 80 parts of glacial acetic acid.

The suspension is then stirred during the addition of a solution of the diazonium chloride from 168 parts of 3-nitro-4-anisidine. The mixture is stirred for one minute and a solution of 28 parts of caustic soda in 900 parts water is then slowly added. The suspension is stirred for a further 30 minutes and filtered and the residue washed with water.

The pigment paste so obtained shows no separation of the constituent pigments when stored for several months. It is satisfactory for pigmentation of viscose before spinning and gives level brown shades of high tinctorial strength and excellent fastness properties.

Example 2

In place of the 70 parts of disodium dinaphthylmethane-di-$\beta$-sulphonate used in Example 1 there is used a mixture of 56 parts of disodium dinaphthylmethane-di-$\beta$-sulphonate and 14 parts of sodium oleo-p-anisidine-3-sulphonate. The resulting pigment paste is mixed with a concentrated aqueous solution of 96 parts of disodium dinaphthylmethane-di-$\beta$-sulphonate and 24 parts of sodium oleo-p-anisidine-3-sulphonate.

Example 3

293 parts of 2:3-hydroxynaphthoic-o-anisidide is dissolved at 95° C. in a solution of 80 parts caustic soda in 4000 parts water. The solution is cooled at 25° C. and diluted with 7800 parts of water. 80 parts of caustic soda are added and the resulting solution filtered to remove suspended solids. The solution is stirred during the addition of firstly an aqueous solution of 100 parts of sodium oleyl sulphate, then 108 parts of carbon black in the form of an aqueous suspension made as described in Example 1. The resulting suspension is stirred at 15° C. and the diazonium chloride solution obtained from 168.4 parts of 2:5-dichloroaniline is added. The pigment suspension so obtained is stirred for 30 minutes and filtered. The residue is washed with cold water, and then mixed with a concentrated aqueous solution of 100 parts of disodium dinaphthylmethane-di-β-sulphonate. The product can be used without further dispersion for the pigmentation of viscose before spinning. It gives level brown shade of high tinctorial strength and of excellent fastness properties which are redder in shade than those produced by the pigments of Examples 1 and 2.

*Example 4*

263 parts 2:3-hydroxynaphthoic-anilide is dissolved at 95° C. in a solution of 80 parts caustic soda in 5000 parts of water. The solution is cooled and diluted with 7800 parts of cold water. 80 parts of caustic soda are added and the resulting solution is filtered to remove suspended solids. The solution is stirred and 100 parts of sodium oleo-p-anisidine-3-sulphonate are added. 47.4 parts of carbon black in the form of an aqueous dispersion made as described in Example 1 are then added. The resulting suspension is stirred and a solution of the diazonium chloride made from 178.2 parts of 2:5-dichloroaniline is added. The reaction mixture is stirred for a further 12 hours.

The suspension so obtained is filtered and the residue washed with cold water. The resulting paste is mixed with a concentrated aqueous solution of 31 parts disodium dinaphthylmethane-di-β-sulphonate.

The product is a stable paste and can be used without further dispersion for the pigmentation of viscose before spinning. It gives brown shades which are richer than those obtained from the products of Examples 1–3.

The pigment pastes of this invention are useful in the production of coloured, regenerated cellulosic structures, such as filaments, threads, sheets, films, ribbons, caps, bands, tubing, sponges, and the like, by direct addition to viscose or other aqueous cellulosic solutions. They may be incorporated in viscose at any time before extrusion through a spinneret or casting hopper; thus, the pigment pastes may be admixed with viscose before the conventional step of removing air from the viscose, or they may be added directly to and admixed with the viscose as it goes to the casting or spinning machine, while avoiding any introduction of air into the viscose.

A typical composition for such usages comprises the following:

100 parts of viscose containing 8.5% cellulose and 6.0% alkalinity.

2 parts of brown pigment paste as described in Example 1.

The amount of paste incorporated in the viscose can be varied quite widely and obviously will depend on the depth of shade and degree of opacity desired.

I claim:

1. Process for the manufacture of highly dispersed brown monoazo pigments useful in the mass pigmentation of viscose which comprises coupling a diazotised monoarylamine with a coupling component selected from the group consisting of acetoacetarylamides and 2:3-hydroxynaphthoic arylamides in the presence of gas black which is in the form of an aqueous dispersion in one of the solutions employed in said coupling operation and contains no particles greater than 10 microns in diameter with the bulk of its particles not greater than 6 microns in diameter.

2. Process for the manufacture of a highly dispersed brown monoazo pigment useful in the mass pigmentation of viscose which comprises coupling a diazotised 2:5-dichloroaniline with acetoacet-o-toluidide in the presence of gas black which is in the form of an aqueous dispersion in one of the solutions employed in said coupling operation and contains no particles greater than 10 microns in diameter with the bulk of its particles not greater than 6 microns in diameter.

3. Process for the manufacture of a highly disposed brown monoazo pigment useful in the mass pigmentation of viscose which comprises coupling a diazotised 2:5-dichloroaniline with 2:3-hydroxynaphthoic-o-anisidide in the presence of gas black which is in the form of an aqueous dispersion in one of the solutions employed in said coupling operation and contains no particles greater than 10 microns in diameter with the bulk of its particles not greater than 6 microns in diameter.

4. Process for the manufacture of a highly dispersed brown monoazo pigment useful in the mass pigmentation of viscose which comprises coupling a diazotised 2:5-dichloro-aniline with 2:3-hydroxynaphthoic-o-anilide in the presence of gas black which is in the form of an aqueous dispersion in one of the solutions employed in said coupling operation and contains no particles greater than 10 microns in diameter with the bulk of its particles not greater than 6 microns in diameter.

JOSEPH GLASSMAN.

REFERENCES CITED

The following references are of record in the file of this patent:

UNITED STATES PATENTS

| Number | Name | Date |
|---|---|---|
| 2,118,512 | Hucks | May 24, 1938 |
| 2,294,306 | Lang | Aug. 25, 1942 |
| 2,305,088 | Kienle et al. | Dec. 15, 1942 |

OTHER REFERENCES

"Lake Pigments from Artificial Colors," Jennison, pages 55 and 56.